March 30, 1965  B. W. KLEIN  3,175,644
FRICTION BRAKE STRUCTURE
Filed Nov. 21, 1961
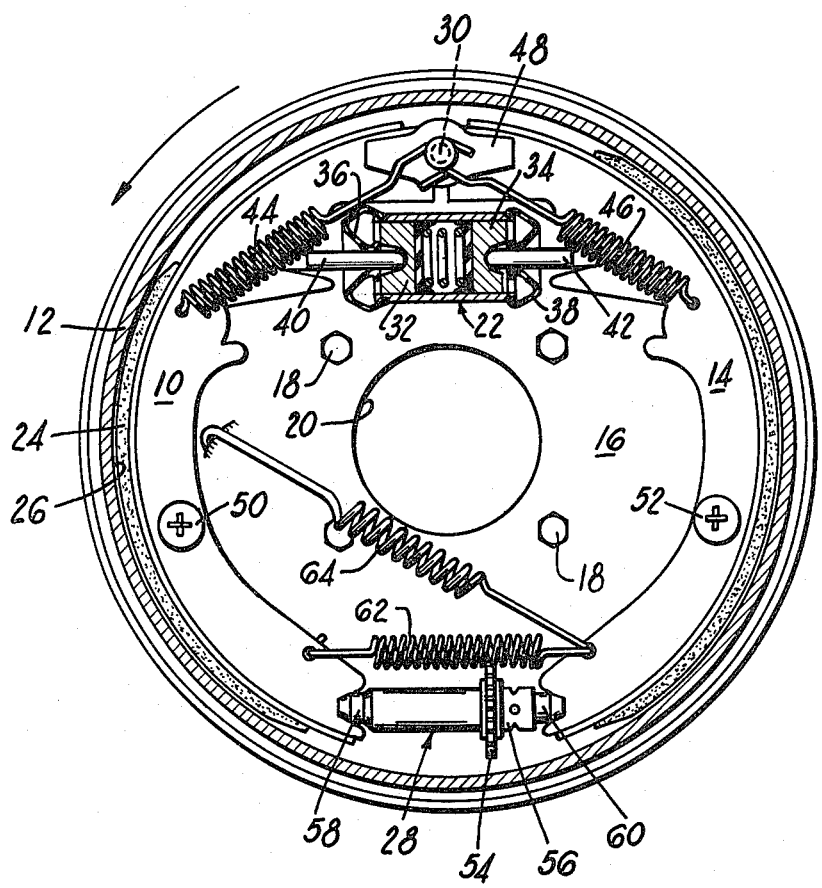
INVENTOR.
BRUCE W. KLEIN
BY
William P. Hickey
ATTORNEY

United States Patent Office 3,175,644
Patented Mar. 30, 1965

3,175,644
FRICTION BRAKE STRUCTURE
Bruce W. Klein, Troy, N.Y., assignor to The Bendix Corporation, South Bend, Ind., a corporation of Delaware
Filed Nov. 21, 1961, Ser. No. 154,008
1 Claim. (Cl. 188—78)

The present invention relates to braking structures of the type wherein friction between a rotating drum and a primary brake shoe produces a force which moves a secondary brake shoe into engagement with the drum; and more particularly to a brake structure of this type having means for preventing dragging of the secondary brake shoe.

In the type of braking structures with which we are concerned, the primary and secondary brake shoes are free to shift forwardly and rearwardly within the drum so that they center themselves about the anchor for the secondary shoe, which is usually located in the region of the brake applying master cylinder. During an application of the brakes, the primary brake shoe forces the secondary brake shoe into engagement with the brake drum; and because the shoe structure is allowed to pivot about the anchor of the brake, there is a tendency for the secondary shoe to remain in engagement with the brake drum when the brake actuating force is removed from the primary shoe by virtue of the self-energization of the secondary shoe. This produces, what is known in the art, as secondary brake shoe drag. Numerous attempts have been made, heretofore, to solve the problem of preventing secondary brake shoe drag without affecting the self-centering feature of the brake shoes; and all of the attempts with which I am familiar have retracted the secondary shoe into engagement with a stop. Such a stop has the disadvantage that it must be continually adjusted as wear of the brake lining takes place, or it will require excessive movement of the secondary shoe after the lining wear occurs.

An object of the present invention is the provision of a new and improved means for positively preventing secondary shoe drag which is simple in design, rugged in construction, and efficient in its operation and which requires no adustment or service.

A further object of the present invention is the provision of a new and improved means for preventing secondary shoe drag in brake structures of the above described type, and wherein return stop means are avoided which require separate adjusting as brake lining wear occurs.

Adjustable means are usually provided in the force transmitting link between the primary and secondary shoes for adjusting the spacing between the shoes as lining wear occurs and thereby hold brake actuating movement to a minimum.

A further object of the present invention is the provision of new and improved means for retracting the secondary brake shoe which utilizes the adjustment provided in the force transmitting link for limiting the retractile movement of the secondary brake shoe so that a separate adjustment need not be provided in the mechanism which prevents secondary shoe drag.

The invention resides in certain constructions and combinations and arrangements of parts; and further objects and advantages of the present invention will become apparent to those skilled in the art to which it relates from the following description of the preferred embodiment described with reference to the accompanying drawing forming a part of this specification, and in which:

The solitary figure of the drawing is a side elevational view of an automotive brake structure embodying principles of the present invention.

The braking structure shown in the drawing is a drum and shoe type brake having a primary shoe 10 whose engagement with the brake drum 12 causes the secondary shoe 14 to be forced into engagement with the drum 12. The brake drum 12 is adapted to be rotated by a wheel of an automotive vehicle which, during forward movement of the vehicle, causes the drum to rotate in a counterclockwise direction as seen in the drawing. The brake drum 12 is supported a fixed distance away from a suitable backing plate 16 which is held stationary with respect to the frame of the vehicle by means of bolts 18 which surround a central opening 20 through which the axle of the vehicle extends. The primary and secondary shoes are of T-shape cross section, and are positioned generally on opposite sides of a wheel cylinder 22 which is fixed to the backing plate 16 in the region above the opening 20. Each of the arcuate brake shoes 10 and 14 are provided with suitable lining material 24 which are adapted to engage the inside frictional surface 26 of a generally cylindrically shaped drum 12 to produce a brake retarding torque upon the drum. Engagement of the primary brake shoe with the brake drum produces a counterclockwise force upon the brake shoe 10, and this force is transmitted from the trailing edge of the primary shoe to the leading edge of the secondary shoe through an adjustable force transmitting link 28. The opposite or trailing end of the secondary shoe 14 is positioned against an abutment pin 30 located in the region above the wheel cylinder 22. Force transmitting from the primary shoe through the force transmitting link 28 therefore causes the secondary shoe to pivot about the abutment pin 30 into firm frictional engagement with the inside surface 26 of the brake drum 12.

During rearward movement of the automotive vehicle, the shoe 14 becomes the primary shoe and the shoe 10 becomes the secondary shoe; and accordingly, the upper end of the shoe 10 is provided with an abutment which will engage the abutment pin 30. During rearward movement of the vehicle, engagement of the shoe 14 with the brake drum produces a force transmitted through the adjustable link 28 to the shoe 10 which pivots its opposite end about the abutment pin 30 and forces it into engagement with the brake drum 12.

The wheel cylinder 22 has an internal chamber extending therethrough with conventional pistons 32 and 34 and seals 36 and 38 therein adjacent its opposite ends. Force is transmitted from these pistons to the primary and secondary shoes through pins 40 and 42 respectively. The upper ends of the primary and secondary brake shoes 10 and 14 are normally held into engagement with the abutment pin 30 by means of shoe return springs 44 and 46—one end of each of which are hooked into suitable openings in the respective brake shoes, and the other end of each of which are positioned in a suitable groove in the abutment pin 30. A wing shaped hold-down washer 48 is positioned between the springs and the webs of the primary and secondary brake shoes to hold the upper end of the brake shoes adjacent the back-up plate 16. The lower end of the brake shoes 12 and 14 are held adjacent the back-up plate 16 by means of tie pins 50 and 52 of conventional construction which are free to pivot with respect to the backing plate. The adjustable force transmitting link 28 is also of conventional construction and includes a ratchet wheel 54 for rotating an intermediate threaded portion 56 of the force transmitting link with respect to its opposite end portions 58 and 60 and thereby expand the length of the link. The ends of the adjustable link 28 merely abut the adjacent ends of the primary and secondary brake shoes 10 and 14, and the assembly is held together by a retaining spring 62 which is bowed up over the ratchet wheel and prevents free rotation of the intermediate portion 56. The intermediate portion 56 is usually adjusted to permit suitable running clearance between the lining 24 and the brake drum surface 26 when the shoe return springs 44 and 46 hold the shoes into engagement with the abutment pin 30. For a more complete understanding of the structure so far described, reference may be had to the Du Buc et al. application Serial No. 101,408, filed April 7, 1961.

It will be seen that the entire structure comprising the brake shoes 10 and 14 and the adjustable link 28 are tied together in a manner which permits their movement as a unit about the adjustment pin 30 so that the brake shoes are free to center themselves with respect to the brake drum 12. A braking application is produced by forcing hydraulic fluid in to the wheel cylinder 22 between its piston seals 36 and 38 to force the pistons 32 and 34 outwardly. This forces the upper ends of each of the primary and secondary brake shoes 10 and 14 outwardly until they engage the brake drum 12; whereupon the friction force between the brake drum and primary brake shoe rotates the primary shoe counterclockwise by a slight amount to produce force upon the adjustable link 28 which in turn forces the leading edge of the secondary shoe into engagement with the rotating brake drum 12. Frictional force between secondary shoe 14 and the brake drum 12 causes the secondary shoe 14 to rotate its trailing end up into engagement with the abutment pin 30 so that the brake shoes 10 and 14 are thereafter held stationary to produce a retarding torque upon the brake drum 12.

When it is desired to release the braking effect, fluid pressure is removed from the wheel cylinder 22; whereupon the leading edge of the primary brake shoe 10 is drawn up into engagement with the abutment pin 30 by means of the shoe return spring 44. Inasmuch as the adjustable link 28 merely abuts the trailing end of the primary brake shoe 10 and the leading end of the secondary brake shoe 14, there is no positive force tending to pull the secondary brake shoe out of engagement with the brake drum. This condition produces what is known in the art as secondary brake drag since the secondary shoe remains in engagement with the brake drum 12. Engagement of the secondary shoe with the brake drum following a release of the brakes causes excessive wear of the lining of the secondary brake shoe, and further causes a certain amount of heat to be continually generated in the brake drum.

According to principles of the present invention, applicant has discovered that the secondary brake shoe 14 can be positively biased out of engagement with the brake drum by a force which acts through the adjustable link 28 to in turn bias the trailing edge of the primary brake shoe 10 into engagement with the brake drum 12. This can be done in any suitable manner, and is quite conveniently accomplished by means of a single spring 64 which is interpositioned between the leading edge of the secondary shoe 14 and the back-up plate 16. The spring 64, shown in the drawing, has one end hooked in the same opening as receives the retaining spring 62, and the other end of the spring 64 is hooked into a suitable opening in the backing plate 16. The anti-drag spring 64 causes the primary brake shoe 10 to pivot about the abutment pin 30 until the trailing edge of the primary shoe rides against the friction surface 26 of the brake drum 12. This acts as a positive stop for the withdrawal of the secondary brake shoe 14 away from the brake drum; and has the advantage that the adjustment of the force transmitting link 28 (that is normally performed periodically during use to compensate for lining wear) automatically also adjusts for the amount of return movement of the secondary shoe after each application. This action can be best understood on recognition of the fact that abutment of primary shoe 10 with the brake drum 12 provides the limit of retraction movement under influence of spring 64. In this retracted condition the trailing or lower edge of the primary shoe will be in contact with the brake drum and secondary shoe 14 will be retracted a positive distance from the brake drum. During use as the lining wears, the clearance distance between secondary shoe and the brake drum will increase; first, because some lining is worn off the secondary shoe increasing clearance; and secondly, because the lining worn off the primary shoe 10, especially at its trailing edge, will permit spring 64 to further shift the floating shoe and adjusting mechanism in a direction to increase secondary shoe clearance. Now as the brakes are adjusted by ratchet wheel 54 to increase the length of link 28, primary shoe 10 will not move in its retracted position since it is already abutting the brake drum. Thus adjustment of link 28 will have the effect of moving secondary shoe 14 back to its initial clearance position so that this position is maintained automatically with brake adjustment. It has been found that this means of preventing secondary shoe drag does not appreciably increase the wear of the lining on the primary shoe 10, and further more does not produce any perceptible amount of heat to be generated in the brake drum 12. The reason why this is true is not altogether apparent. One contributing factor to the lack of detrimental results might be due in part to the fact that the normal dragging which is imparted to the primary shoe 10 by the anti-drag spring 64 is limited to the trailing edge only of the primary shoe.

It will be apparent that the objects heretofore enumerated as well as others have been accomplished; and that there has been provided a simple fool-proof and very inexpensive means for preventing the secondary shoe drag in brake structures of the above described type.

While the invention has been described in considerable detail, I do not wish to be limited to the particular embodiments shown and described; and it is my intention to cover hereby all novel adaptations, modifications, and arrangements thereof which come within the practice of those skilled in the art to which the invention relates.

I claim:

In a friction brake:

a stationary backing plate, a brake drum having a surface of revolution for producing friction supported a fixed distance away from said backing plate, a primary and a secondary brake shoe supported on said backing plate and positioned for movement against said surface of revolution, said primary and secondary shoes arranged to have two pairs of adjacent ends, an adjustable link connected between one pair of adjacent ends of said primary and secondary shoes for transmitting force between shoes and establishing adjustable clearance spacing, an abutment pin secured to said backing plate providing a pivot abutment stop for the other pair of adjacent ends of said primary and secondary shoes, a hydraulic wheel cylinder supported by said backing plate between said primary and secondary shoes proximate said other pair of adjacent ends, said wheel cylinder including a pair of hydraulically-actuated opposed pistons each connected to one of said primary and secondary shoes to actuate said shoes radially outwardly into frictional contact with said surface of revolution on application of hydraulic pressure, first and second return springs each connected on one end to said abutment pin and on the other end to said primary and secondary shoe respectively to urge said shoes against said abutment pin in opposition to said pistons, tie pin means yieldably connecting said shoes to said backing plate, a spring member having one end connected to said secondary shoe adjacent said adjustable link and its other end connected to said backing plate to bias one end of said secondary shoe out of engagement with said surface of revolution and the adjacent end of said primary shoe into engagement with said surface of revolution with a predetermined force.

References Cited by the Examiner

UNITED STATES PATENTS

| | | | |
|---|---|---|---|
| 1,741,577 | 12/29 | Lyman et al. | 188—78 |
| 1,762,290 | 6/30 | Dodge | 188—78 X |
| 2,012,661 | 8/35 | Frank | 188—78 |
| 2,724,460 | 11/55 | Brooks | 188—78 |

FOREIGN PATENTS

| | | |
|---|---|---|
| 822,496 | 11/51 | Germany. |
| 890,164 | 9/53 | Germany. |

MILTON BUCHLER, *Primary Examiner.*

A. JOSEPH GOLDBERG, ARTHUR L. LA POINT,
*Examiners.*